United States Patent
Joung et al.

(10) Patent No.: US 12,494,325 B2
(45) Date of Patent: Dec. 9, 2025

(54) DYE-SENSITIZED SOLAR CELL AND ELECTROLYTE THEREOF, AND METHODS OF MANUFACTURING DYE-SENSITIZED SOLAR CELL AND ELECTROLYTE

(71) Applicant: ACE INVENTER INC., Seoul (KR)

(72) Inventors: Young Soo Joung, Seoul (KR); Jee Yoon Kim, Seoul (KR); Ga Hee Yoo, Seoul (KR); Hyun Young Lee, Seoul (KR)

(73) Assignee: ACE INVENTER INC., Seoul (KR)

(*) Notice: Subject to any disclaimer, the term of this patent is extended or adjusted under 35 U.S.C. 154(b) by 483 days.

(21) Appl. No.: 17/779,236

(22) PCT Filed: Feb. 25, 2021

(86) PCT No.: PCT/KR2021/002385
§ 371 (c)(1),
(2) Date: May 24, 2022

(87) PCT Pub. No.: WO2021/172896
PCT Pub. Date: Sep. 2, 2021

(65) Prior Publication Data
US 2022/0406531 A1    Dec. 22, 2022

(30) Foreign Application Priority Data

Feb. 26, 2020 (KR) .................. 10-2020-0023515
Feb. 26, 2020 (KR) .................. 10-2020-0023516

(51) Int. Cl.
*H01G 9/00* (2006.01)
*C08J 5/22* (2006.01)
(Continued)

(52) U.S. Cl.
CPC .......... *H01G 9/0036* (2013.01); *C08J 5/2287* (2013.01); *C08L 33/26* (2013.01);
(Continued)

(58) Field of Classification Search
CPC .. H01G 9/0036; H01G 9/2009; H01G 9/2022; H01G 9/2059; H01G 9/2031;
(Continued)

(56) References Cited

FOREIGN PATENT DOCUMENTS

JP     2012-021212      2/2012
KR   10-2009-0076410    7/2009
(Continued)

OTHER PUBLICATIONS

Yu et al., "A smart polymer with a high sensitivity to temperature and humidity based on polyacrylamide hydrogel doped with polyiodide", J. Mater. Chem. C, 4, (pp. 11055-11058), 2016 (Year: 2016).*
(Continued)

*Primary Examiner* — Scott B Geyer (57) ABSTRACT

Provided is a method of manufacturing an electrolyte for dye-sensitized solar cells, the method including: preparing a hydrogel membrane; immersing the hydrogel membrane in an electrolyzing solution containing iodine or iodide such that the hydrogel membrane is impregnated with iodide ions; and drying the hydrogel membrane.

16 Claims, 7 Drawing Sheets

(51) Int. Cl.
   *C08L 33/26*    (2006.01)
   *C25D 13/02*    (2006.01)
   *C25D 13/12*    (2006.01)
   *H01G 9/20*     (2006.01)

(52) U.S. Cl.
   CPC ............. *C25D 13/02* (2013.01); *C25D 13/12* (2013.01); *H01G 9/2009* (2013.01); *C08J 2333/26* (2013.01); *C08J 2405/04* (2013.01); *C08L 2203/204* (2013.01); *H01G 9/2022* (2013.01); *H01G 9/2059* (2013.01)

(58) Field of Classification Search
   CPC .. C08J 5/2287; C08J 2333/26; C08J 2405/04; C08L 33/26; C08L 2203/204; C25D 13/02; C25D 13/12; C25D 13/22; C08F 220/56
   See application file for complete search history.

(56) References Cited

FOREIGN PATENT DOCUMENTS

| KR | 10-2009-0128893 | 12/2009 |
| KR | 10-2012-0114031 | 10/2012 |
| KR | 10-2014-0007037 | 1/2014 |

OTHER PUBLICATIONS

Office Action for Korea Patent Application No. 10-2020-0023515, mailed Aug. 13, 2021.
Office Action for Korea Patent Application No. 10-2020-0023515, mailed Feb. 24, 2022.
Scientific Reports, H. Koo et al., 'Regenerable Photovoltaic Devices with a Hydrogel-Embedded Microvascular Network', DOI:10.1038 (Aug. 5, 2013.).
Office Action for Korea Patent Application No. 10-2020-0023516, mailed Aug. 13, 2021.
Office Action for Korea Patent Application No. 10-2020-0023516, mailed Feb. 22, 2022.
PCT International Search Report and Written Opinion for International Application No. PCT/KR2021/002385, Date of Mailing: Aug. 6, 2021.
Journal of Materials Chemistry C, Hongtao Yu et al., "A smart polymer with a high sensitivity to temperature and humidity based on polyacrylamide hydrogel doped with polyiodide," Nov. 8, 2016, vol. 4, No. 47, pp. 11055-11058.

* cited by examiner

DYE-SENSITIZED SOLAR CELL AND ELECTROLYTE THEREOF, AND METHODS OF MANUFACTURING DYE-SENSITIZED SOLAR CELL AND ELECTROLYTE

TECHNICAL FIELD

The present invention relates to an electrolyte for dye-sensitized solar cells that includes a hydrogel, a dye-sensitized solar cell including the electrolyte, and a method of manufacturing the dye-sensitized solar cell.

BACKGROUND ART

Recently, interest in alternative energy sources that can replace conventional fossil fuels has been rapidly increasing. Thereamong, solar cells using solar energy are attracting attention because they are infinite and environmentally friendly, unlike other energy sources (nuclear energy, etc.).

Since a Se solar cell was developed in 1983, a silicon solar cell has recently been attracted attention. However, such a silicon solar cell has a problem in that it is difficult to put into practical use because the manufacturing cost is quite high. To overcome this problem, R&D is being actively conducted on a dye-sensitized solar cell with a low manufacturing cost.

Unlike a silicon solar cell, a dye-sensitized solar cell is a photoelectrochemical solar cell that is mainly composed of a photosensitive dye molecule that can absorb visible light to generate electron-hole pairs; and a transition metal oxide that transports the generated electrons. As a representative example of dye-sensitized solar cells known so far, there is a solar cell published by Gratzel et al. of Switzerland.

Figure 1:
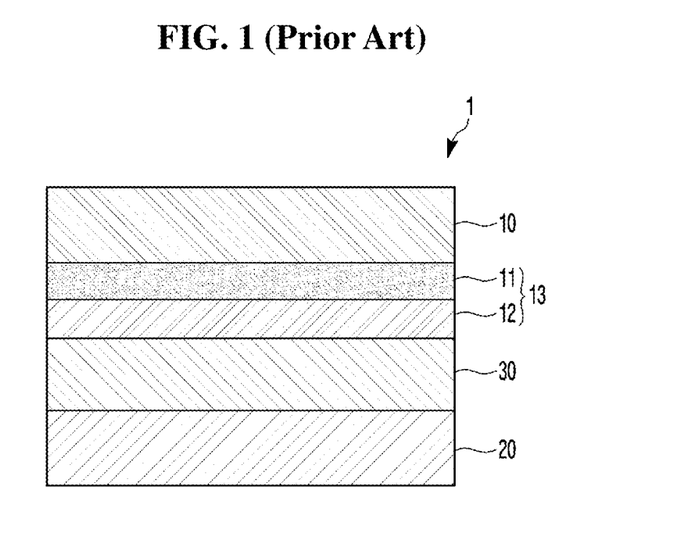
FIG. 1 illustrates the structure of an existing dye-sensitized solar cell.

FIG. 1 illustrates the structure of an existing dye-sensitized solar cell.

As shown in FIG. 1, an existing dye-sensitized solar cell 1 includes a working electrode 10, a counter electrode 20 disposed to face the working electrode 10, and an electrolyte 30 interposed between the working electrode 10 and the counter electrode 20, wherein the light absorption layer 13 may be disposed on one side of the working electrode 10 and the light absorption layer 13 may generally include a metal oxide 11 such as titanium oxide ($TiO_2$) to which a dye 12 such as cadmium sulfide (CdS) is adsorbed.

The dye 12 may represent a neutral(S), a transition state (S*), and an ionic state (S+), respectively. When sunlight is absorbed, dye molecules electronically transit from a ground state (S/S+) to an excited state (S*/S+) to form electron-hole pairs. The excited electrons move to the conduction band (CB) of metal oxide and then diffuse to the working electrode 10, and electrons reaching the working electrode 10 moves to the counter electrode 20 through an external circuit to generate an electromotive force.

The dye whose electrons have been lost by the metal oxide can be reduced by gaining electrons from the electrolyte 30. In the electrolyte 30, for example, iodide ions can be oxidized to iodine to supplement the dye with electrons, and iodine can receive electrons, which have reached the counter electrode 20, and can be reduced back to iodide.

Through repetition of the redox process, a solar cell operates.

The aforementioned dye-sensitized solar cell has the potential to replace conventional solar cells because it is eco-friendly and flexible, has a lower manufacturing cost per power compared to conventional silicon cells, can provide color, and can secure transparency, thereby having attracted attention.

However, it is difficult to attach the working electrode 10 and the counter electrode 20 to the electrolyte 30 in the dye-sensitized solar cell, and the power generation efficiency of the solar cell is decreased because the electrolyte in a liquid state may leak or volatilize, which is eventually a factor causing the lifespan to come to an end and thus becomes a fatal problem for the durability of the dye-sensitized solar cell.

Therefore, there is a need for technology for addressing the problems.

DISCLOSURE

Technical Problem

Therefore, the present invention has been made in view of the above problems, and it is one object of the present invention to provide a dye-sensitized solar cell and electrolyte thereof having all of the advantages, i.e., high ionic conductivity and high power generation efficiency, of a liquid electrolyte; and the advantage, i.e., low leakage possibility, of a solid electrolyte, and methods of manufacturing the solar cell and the electrolyte.

Technical Solution

In accordance with an aspect of the present invention, the above and other objects can be accomplished by the provision of a method of manufacturing an electrolyte for dye-sensitized solar cells, the method including: preparing a hydrogel membrane; immersing the hydrogel membrane in an electrolyzing solution containing iodine or iodide such that the hydrogel membrane is impregnated with iodide ions; and drying the hydrogel membrane.

According to an embodiment, in the preparing of the hydrogel membrane, a polymerization initiator and an accelerator may be added to an aqueous solution in which a water-soluble polymer and a crosslinking agent are dissolved and cast into a mold.

According to an embodiment, in the preparing of the hydrogel membrane, a polymerization initiator and an accelerator may be added to an aqueous solution in which a water-soluble polymer and a crosslinking agent are dissolved, and the aqueous solution may be injected between two plates. Here, the thickness of the hydrogel membrane may be controlled by adjusting the volume of the aqueous hydrogel solution injected between the two plates or by adjusting a gap between the two plates.

According to an embodiment, the electrolyzing solution may be prepared by immersing the hydrogel membrane in a solution in which iodine or the iodide is dissolved at a concentration of 0.03 to 2 M.

According to an embodiment, in the immersing of the hydrogel membrane, the hydrogel membrane may be immersed in the electrolyzing solution, and then allowed to stand for a predetermined time.

According to an embodiment, in the preparing of the hydrogel membrane, a polymerization initiator and an accelerator may be added to an aqueous solution in which a water-soluble polymer and a crosslinking agent are dissolved, and the aqueous solution may be injected between two plates, and in the immersing of the hydrogel membrane, one of the two plates may be separated, and then immersed in the electrolyzing solution, and then allowed to stand for a predetermined time.

In accordance with another aspect of the present invention, there is provided an electrolyte for dye-sensitized solar cells, manufactured by impregnating a hydrogel membrane with iodide ions.

In accordance with another aspect of the present invention, there is provided a dye-sensitized solar cell, including: a working electrode; a counter electrode disposed to face the working electrode; the electrolyte, according to claim 5, interposed between the working electrode and the counter electrode; and a light absorption layer interposed between the working electrode and the electrolyte and configured to include a metal oxide to which a dye is adsorbed.

In accordance with another aspect of the present invention, there is provided a method of manufacturing a dye-sensitized solar cell, the method including: adding a polymerization initiator to an aqueous solution prepared by dissolving a water-soluble polymer and a crosslinking agent in water to prepare an aqueous solution for molding hydrogels; injecting the aqueous solution for molding hydrogels between a working electrode and a counter electrode provided to face the working electrode; and solidifying the aqueous solution for molding hydrogels to mold a hydrogel membrane between the working electrode and the counter electrode.

In accordance with another aspect of the present invention, there is provided a method of manufacturing a dye-sensitized solar cell, the method including: adding a polymerization initiator to an aqueous solution prepared by dissolving a water-soluble polymer and a crosslinking agent in water to prepare an aqueous solution for molding hydrogels; injecting the aqueous solution for molding hydrogels between a working electrode or a counter electrode and a dummy substrate; solidifying the aqueous solution for molding hydrogels to mold a hydrogel membrane between the working electrode or the counter electrode and the dummy substrate; and removing the dummy substrate and attaching the counter electrode or the working electrode to an exposed surface of the hydrogel membrane.

According to an embodiment, the counter electrode may be formed by coating a conductive material on a substrate, the conductive material being any one selected from the group consisting of platinum, gold, carbon and carbon nanotubes (CNT), or a combination thereof.

According to an embodiment, before the injecting the aqueous solution, forming a light absorption layer, which includes a metal oxide coated with a dye, on one side surface of the working electrode may be further included.

According to an embodiment, the forming of the light absorption layer may include: preparing a non-conductive member; immersing the working electrode and the counter electrode, between which the non-conductive member is interposed, in a solution in which a metal oxide is dissolved; applying a voltage to the working electrode and the counter electrode to coat at least one exposed surface of the working electrode and the counter electrode with the metal oxide; and applying a dye solution on the metal oxide coated on one side surface of the working electrode to form the light absorption layer.

According to an embodiment, in the immersing of the working electrode and the counter electrode, the solution may be prepared by dissolving $TiO_2$ as the metal oxide in acetylacetone as an organic solvent, and the working electrode and the counter electrode between which the non-conductive member is interposed may be immersed in the solution.

According to an embodiment, before injecting the aqueous solution, forming a light absorption layer including a metal oxide on one side surface of the working electrode; and coating the light absorption layer with a dye; may be further included.

According to an embodiment, the method may further include immersing the hydrogel membrane in an electrolyzing solution containing iodine and iodide to impregnate the hydrogel membrane with iodide ions.

According to an embodiment, before removing the dummy substrate, immersing the hydrogel membrane in an electrolyzing solution containing iodine and iodide to impregnate the hydrogel membrane with iodide ions may be further included.

According to an embodiment, in adding the polymerization initiator to the aqueous solution, an accelerator may be further added.

In accordance with another aspect of the present invention, there is provided a dye-sensitized solar cell, including: a working electrode; a counter electrode disposed to face the working electrode; an electrolyte interposed between the working electrode and the counter electrode; and a light absorption layer interposed between the working electrode and the electrolyte and configured to include a metal oxide to which a dye is adsorbed, wherein the electrolyte is a hydrogel membrane molded by injecting an aqueous solution for molding hydrogels, prepared by adding a polymerization initiator to an aqueous solution in which a water-soluble polymer and a crosslinking agent are dissolved, between the working electrode and the counter electrode and solidifying the aqueous solution.

In accordance with yet another aspect of the present invention, there is provided a dye-sensitized solar cell, including: a working electrode; a counter electrode disposed to face the working electrode; an electrolyte interposed between the working electrode and the counter electrode; and a light absorption layer interposed between the working electrode and the electrolyte and configured to include a metal oxide to which a dye is adsorbed, wherein the electrolyte is a hydrogel membrane molded by injecting an aqueous solution for molding hydrogels, prepared by adding a polymerization initiator to an aqueous solution in which a water-soluble polymer and a crosslinking agent are dissolved, between the working electrode or the counter electrode and the counter electrode and solidifying the aqueous solution.

Advantageous Effects

A dye-sensitized solar cell, including a hydrogel electrolyte according to the present invention, can have all of the advantages, i.e., high ionic conductivity and high power generation efficiency, of a liquid electrolyte; and the advantage, i.e., low leakage possibility, of a solid electrolyte.

In addition, by using a hydrogel as an electrolyte, the dye-sensitized solar cell can have excellent surface adhesion and excellent mechanical strength, thereby having high bonding strength to an electrode and thus having high transparency (or light transmittance) and flexibility.

BEST MODE

Now, the present invention will be described in detail with reference to the following desirable embodiments. Terms or words used herein shall not be limited to common or dictionary meanings and have meanings corresponding to technical aspects of the embodiments of the present invention so as to express the embodiments of the present invention most suitably. Accordingly, the constructions of examples and drawings disclosed in the present specification are merely preferred embodiments of the present invention and do not represent the full technical spirit of the present invention. Therefore, it should be understood that various equivalents and modifications may have been present at a filling time of the present application. Throughout this specification, unless explicitly described to the contrary, the word "comprise" and variations such as "comprises" or "comprising", will be understood to imply the inclusion of stated elements but not the exclusion of any other elements.
Method of Manufacturing Electrolyte for Dye-Sensitized Solar Cells FIG. 2 illustrates a step-by-step flowchart of a method of manufacturing an electrolyte for dye-sensitized solar cells according to an embodiment of the present invention.

Figure 2:
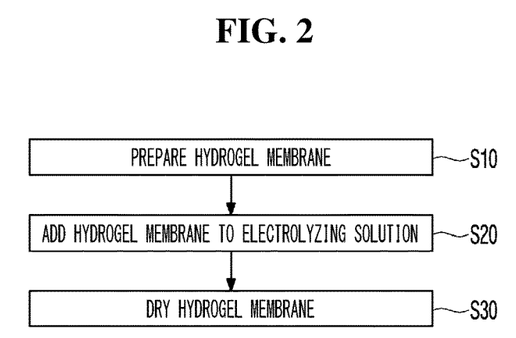
FIG. 2 illustrates a step-by-step flowchart of a method of manufacturing an electrolyte for dye-sensitized solar cells according to an embodiment of the present invention.

As shown in FIG. 2, the method of manufacturing an electrolyte for dye-sensitized solar cells according to an embodiment of the present invention includes a step (S10) of preparing a hydrogel membrane, a step (S20) of immersing the hydrogel membrane in an iodine or iodide-containing aqueous solution such that the hydrogel membrane is impregnated with iodine ions, and a step (S30) of drying the hydrogel membrane, thereby generating an electrolyte for dye-sensitized solar cells.

That is, the electrolyte for dye-sensitized solar cells, according to an embodiment of the present invention, is manufactured by molding a hydrogel and then permeating iodine ions into the hydrogel-molded body.

Among the terms used herein, "hydrogel membrane" refers to a molded article formed from a hydrogel. The term "hydrogel membrane" is used for easy description of the present invention because a hydrogel used as an electrolyte for dye-sensitized solar cells has the form of a thin film or sheet, but the scope of the present invention is not limited to a hydrogel having a membrane or sheet shape.

In the step (S10) of preparing a hydrogel membrane, a hydrogel membrane may be prepared using a known composition or a known manufacturing method. According to a preferred embodiment of the present invention, to provide a hydrogel membrane having excellent surface adhesion, excellent mechanical strength, high light transmittance, and high flexibility as an electrolyte for dye-sensitized solar cells, a polymerization initiator and an accelerator may be added to an aqueous solution prepared by dissolving a water-soluble polymer and a crosslinking agent in water, and this mixture may be cast into a mold to be molded.

Here, the water-soluble polymer may be any one selected from the group consisting of alginic acid, chitosan, alginate, dextran, oxidized dextran, heparin, hyaluronic acid, agarose, carrageenan, amylopectin, amylose, glycogen, starch, cellulose, chitin, heparan sulfate, chondroitin sulfate, dextran sulfate, dermatan sulfate, keratan sulfate, pectins, xanthan gum, carboxymethylcellulose, homo- and copolymers of acrylamide, polyacrylic acid, polyethylene oxide, polyvinyl alcohol, a polyvinyl alcohol-polyvinyl acetate copolymer, poly(N-vinylpyrrolidone), and poly(hydroxyethyl acrylate) or a combination thereof. Such natural and synthetic water-soluble polymers may have preferably an average molecular weight of 100 to 1,000,000, more preferably, an average molecular weight of 700 to 200,000.

According to a particular embodiment, acrylamide and sodium alginate may be dissolved in water (or deionized water). Here, the amounts of water, acrylamide and sodium alginate are preferably 80 to 90 parts by weight, 10 to 15 parts by weight and 0.01 to 0.5 parts by weight, respectively, more preferably 85 to 90 parts by weight, 12 to 13 parts by weight and 0.4 to 0.5 parts by weight, respectively.

Here, the content of water is preferably 80 to 90 parts by weight, as described above. When the content of water is less than 80 parts by weight, the hygroscopicity of the hydrogel increases so that the hydrogel may deteriorate over time. When the content of water exceeds 80 parts by weight, the adhesive hydrogel may shrink when dried, or the properties thereof may be changed.

In a subsequent process, a polymerization initiator and a crosslinking agent may be added to the aqueous solution.

The polymerization initiator may be a photo-radical polymerization initiator or a thermal radical polymerization initiator. Here, the photo-radical polymerization initiator may be, without being specifically limited to, for example, α-hydroxy ketone, α-aminoketone, benzyl-methyl ketal, bisacylphosphine oxide, metallocene, or the like, more particularly 1-[4-(2-hydroxyethoxy)-phenyl]-2-hydroxy-2-methyl-propan-1-one, 2-hydroxy-2-methyl-1-phenyl-propan-1-one, 1-hydroxy-cyclohexyl-phenyl-ketone, 2-methyl-1-[(methylthio)phenyl]-2-morpholinopropan-1-one, 2-benzyl-2-dimethylamino-1-(4-morpholinophenyl)-butan-1-one, or the like. These photo-radical polymerization initiators may be used alone or as a combination of two or more thereof.

In addition, the thermal radical polymerization initiator may be, without being specifically limited to, for example, an organic peroxide such as benzoyl peroxide, an azo-based polymerization initiator such as azobisisobutyronitrile, a persulfate such as potassium persulfate or ammonium persulfate, an azo compound such as 2,2-azobisamidinopropane dihydrochloride, or the like.

According to an embodiment of the present invention, the content of the polymerization initiator is, without being specifically limited to, preferably 0.01 to 1 part by weight with respect to the aqueous solution, including acrylamide and sodium alginate. When the content of the polymerization initiator is less than 0.01 parts by weight, the polymerization reaction does not proceed sufficiently. When the content of the polymerization initiator exceeds 1 part by weight, the resulting hydrogel may be discolored (yellowed)

or stink due to the residue of the polymerization initiator after the polymerization reaction.

More preferably, the content of the polymerization initiator may be 0.05 to 0.5 parts by weight.

In addition, in addition to the polymerization initiator, a crosslinking agent may be added to the aqueous solution. According to a preferred embodiment, the crosslinking agent may be dissolved, without being specifically limited to, in the aqueous solution using N,N'-methylenebisacrylamide.

Although the type of the crosslinking agent is not specifically limited, the crosslinking agent is preferably two or more polymerizable double bonds in the molecule and may be, for example, N,N'-methylenebisacrylamide, diethylene glycol diacrylate and dimethacrylate, ethylene glycol diacrylate and dimethacrylate, tetra(ethylene glycol) diacrylate, 1,6-hexanediol diacrylate, divinylbenzene, trimethylolpropane triacrylate, poly(ethylene glycol) diacrylate, or the like. These compounds may be used alone or as a combination of two or more thereof.

The content of the crosslinking agent, according to an embodiment of the present invention may be 0.001 to 0.05 parts by weight, more preferably 0.0015 to 0.02 parts by weight, with respect to the aqueous solution including acrylamide and sodium alginate.

Next, the aqueous solution includes acrylamide and sodium alginate, ammonium persulfate as a polymerization initiator and N,N'-methylenebisacrylamide as a crosslinking agent are added may be defoamed. This is performed because the mechanical strength of a molded hydrogel is decreased when the aqueous solution contains air bubbles.

According to a particular embodiment, after the aqueous solution is fed into a vacuum chamber, the vacuum chamber may be vacuumed such that air bubbles in the aqueous solution are removed, or air bubbles are attached to the walls of a container containing the aqueous solution regardless of a vacuuming time or a residual air pressure inside the vacuum chamber. However, a defoaming process may be omitted if air bubbles are not generated when the solution is mixed.

Next, an accelerator, which is a catalyst added to increase a reaction rate, may be added to the aqueous solution.

The accelerator may also be dissolved, without being specifically limited to, in the aqueous solution using N,N,N',N'-tetramethylenediamine according to a preferred embodiment.

The content of the accelerator, according to an embodiment of the present invention may be, without being specifically limited to, 0.01 to 0.05 parts by weight, preferably 0.03 to 0.04 parts by weight, with respect to the aqueous solution, including acrylamide and sodium alginate.

Since gelation may be quickly performed after the dissolution of the accelerator, it is preferred to cast the accelerator into a mold within about 3 minutes after dissolving the accelerator to obtain a molded hydrogel.

Specifically, the aqueous solution may be added to an acrylic mold to mold a hydrogel membrane having a predetermined thickness. Here, to use as an electrolyte for dye-sensitized solar cells, the hydrogel membrane is molded to a thickness of 0.5 to 2 mm, preferably a thickness of 1 mm. Therefore, the method of producing a hydrogel film using a mold is suitable for use when a required film thickness is 0.5 mm or more.

Alternatively, a hydrogel membrane may be produced by putting an aqueous solution between two plates and solidifying the same, and the thickness of the hydrogel film may be controlled by adjusting the volume of the aqueous solution injected into the two plates or by arbitrarily fixing the gap between the two plates. Here, for use as an electrolyte for dye-sensitized solar cells, the hydrogel membrane is molded to a thickness of 10 µm to 1000 µm, preferably a thickness of 20 µm or less. Therefore, the hydrogel membrane production method using plates is advantageous for thin-film production compared to the mold method and is suitable for use when a required film thickness is 0.5 mm or less.

Here, heating may be performed to promote a gelation reaction due to the accelerator, and UV light may be irradiated to promote the reaction of N,N,N',N'-tetramethylenediamine during the heat treatment process.

The heat treatment process may be performed in a dryer at 30 to 60° C. for 0.5 to 5 hours, preferably at 50° C. for 1 to 3 hours. To promote the reaction of N,N,N',N'-tetramethylenediamine during the heat treatment process, UV light may be used.

Next, a hydrogel membrane or sheet prepared through the processes is immersed in the electrolyzing solution containing iodine and/or iodide (S20), and the iodine ion-impregnated hydrogel membrane is dried (S30), thereby producing an electrolyte for dye-sensitized solar cells.

The electrolyte serves to improve conductivity, and the electrolyzing solution for immersing the hydrogel membrane is prepared by dissolving iodine and/or iodide in water (or deionized water). The concentration of iodine and/or iodide in the electrolyzing solution may be preferably 0.03 to 2 M, more preferably 0.05 to 1 M.

When the concentration of iodine or iodide is less than 0.03 M, the conductivity of the electrolyte is low. When the concentration of iodine or iodide exceeds 2 M, it is difficult to dissolve solid iodine in deionized water.

When dissolved in a non-polar solvent, the solubility is very high compared to when dissolved in water, and when dissolved in other organic solvents such as methanol and ethanol, solubility is higher than when dissolved in water. However, it is preferable to use water as the main solvent to secure the safety and reliability of the dye-sensitized solar cell. That is, water may be used as a solvent to inject ions into the formed hydrogel membrane.

The iodide preferably contains a compound having an iodide ion as a counterion capable of releasing an iodide ion. The compound having an iodide ion as a counterion is not specifically limited so long as it is a compound capable of providing an iodide ion to a solution, and the compound is preferably a compound with a high degree of dissociation of an iodide ion.

As a specific example, the compound having an iodide ion as a counterion may be lithium iodide, sodium iodide, potassium iodide, trimethylammonium iodide, tetrabutylammonium iodide, 1,3-dimethylimidazolium iodide, 1-ethyl-3-methylimidazolium iodide, 1-methyl-3-propylimidazolium iodide, 1-butyl-3-methylimidazolium iodide and 1,2-dimethyl-3-propylimidazolium iodide, or the like. These compounds may be used alone or as a combination of two or more thereof.

To promote the dissolution of iodine and/or iodide in water, the solution may be heated using a heating device such as a hot plate at 30 to 50° C. or may be mixed using a magnetic bar.

Next, the hydrogel membrane is preferably immersed in the electrolyzing solution such that iodide ions sufficiently permeate into the hydrogel membrane and are preferably allowed to stand for a certain time at room temperature.

Here, the standing time preferably depends upon the area of the hydrogel membrane. According to an embodiment, the standing time is preferably 1 minute or more because iodide ions do not sufficiently permeate the hydrogel membrane when the standing time is less than 1 minute.

Here, the standing time may be 2 hours or more or until the iodide is all wetted by the hydrogel. In this case, the electrolyzing solution serves as a kind of stock solution such that the moisture of a produced hydrogel membrane does not evaporate and dry.

The concentration of iodide ions in the hydrogel membrane may be arbitrarily adjusted by taking out the iodide ion-permeated hydrogel membrane at a certain time after 1 minute after immersing the hydrogel membrane in the electrolyzing solution at room temperature.

In addition, the concentration of iodide ions in the hydrogel membrane may be controlled by injecting iodide ions into a mold for producing hydrogel membranes.

The electrolyte of the dye-sensitized solar cell, according to an embodiment of the present invention, can be prepared by taking out the hydrogel membrane permeated with iodide ions from the electrolyzing solution and drying it at room temperature.

An electrolyte for dye-sensitized solar cells, according to an embodiment of the present invention, may be produced by taking out the iodide ion-permeated hydrogel membrane from the electrolyzing solution and drying the membrane at room temperature.

Hereinafter, specific examples of the electrolyte for dye-sensitized solar cells of the present invention are described in detail. These examples should not be construed as limiting the scope of the present invention.

Example 1—Electrolyte for Dye-Sensitized Solar Cells

Deionized water, acrylamide and sodium alginate were prepared in a ratio of 87.4 parts by weight, 12.19 parts by weight, and 0.41 parts by weight, respectively. Acrylamide and sodium alginate were dissolved in deionized water, and then 0.12 parts by weight of ammonium persulfate with respect to the solution and 0.018 parts by weight of N,N'-methylenebisacrylamide with respect to the solution were additionally dissolved in the solution. This solution was maintained in a vacuum chamber until air bubbles therein were removed.

In the evacuated solution, N,N,N',N'-tetramethylenediamine was additionally dissolved in an amount of 0.034 parts by weight with respect to the mixture of deionized water, acrylamide and sodium alginate. Next, 5 ml of the mixture was placed in an acrylic mold of 5 cm×5 cm×5 cm and was thermally treated in a 50° C. dryer for 2 hours. Here, UV light was irradiated during the heat treatment process to mold a hydrogel membrane having a thickness of 2 mm.

Meanwhile, iodine and lithium iodide were dissolved in deionized water at a concentration of 0.05 M, respectively. To promote dissolution, the mixture was stirred by means of a magnetic bar while heating to 40° C. using a hot plate.

Alternatively, 0.05 M lithium iodide may be dissolved in 0.5 M aqueous iodine solution. Here, a hot plate and a magnetic bar are not used.

Next, the molded hydrogel membrane was immersed for 20 minutes in the electrolyzing solution in which iodine and lithium iodide were dissolved, and then taken out and dried at room temperature until the water was removed.

Experimental Example 1—Electrolyte for Dye-Sensitized Solar Cells

The hydrogel membrane manufactured according to Example 1 showed an ionic conductivity of 50% to 100% compared to a liquid electrolyte at the same concentration.

Figure 3:
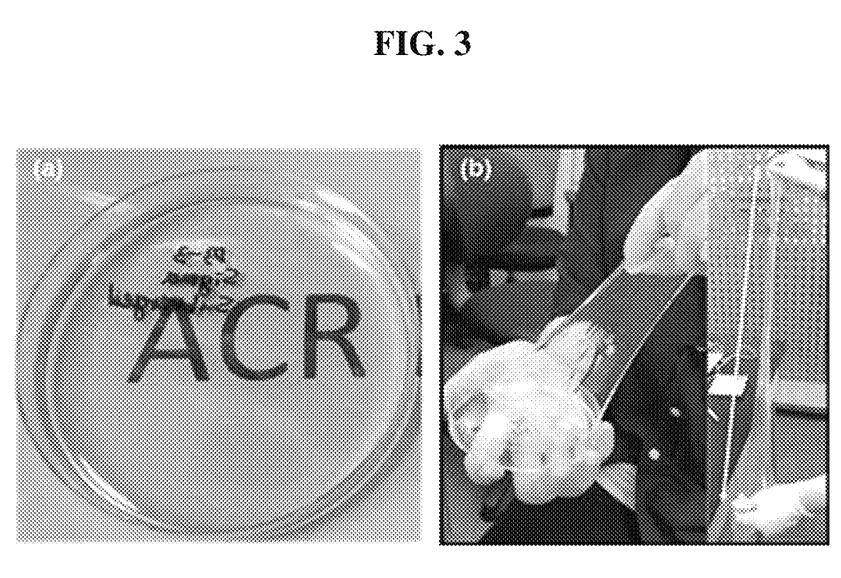
FIG. 3 is a set of photographs illustrating the transparency, adhesion, and tensile force test results of a hydrogel manufactured according to an embodiment of the present invention.

In addition, as a result of a light absorbance measured at a wavelength of 600 nm using a spectrophotometric method to determine light transmittance, a hydrogel membrane having a thickness of 2 mm exhibited a light transmittance of 99.3% (see FIG. 3(a)).

In addition, the adhesive strength was 40 g/cm$^2$ or more, and the elongation strength was improved by 3 to 10 times compared to a hydrogel film having a cross-sectional area of 5 cm$^2$ and a length of 5 cm (see FIG. 3(b)).

Method of Manufacturing Dye-Sensitized Solar Cell

Since the electrolyte for dye-sensitized solar cells manufactured according to an embodiment of the present invention has surface adhesion, the electrolyte is interposed between the working electrode 10 and the counter electrode 20 that are manufactured according to known methods and the working electrode 10 are the counter electrode 20 are mutually pressed, thereby producing a dye-sensitized solar cell 1.

Here, the working electrode 10 may include a light absorption layer 13 that includes a metal oxide 11 manufactured by coating a dye 12 (e.g., N-719, etc.) on one side surface of a conductive substrate coated with a conductive material (e.g., FTO, etc.).

Figure 4:
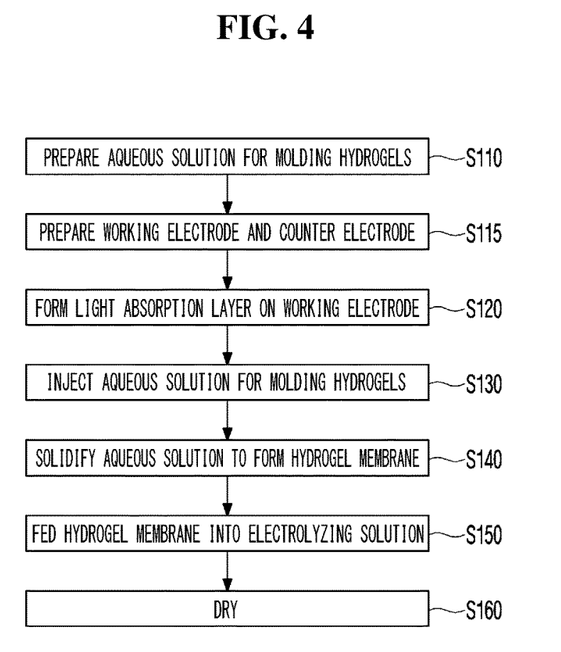
FIG. 4 illustrates a step-by-step flowchart of a method of manufacturing a dye-sensitized solar cell according to an embodiment of the present invention.

FIG. 4 illustrates a step-by-step flowchart of a method of manufacturing a dye-sensitized solar cell according to an embodiment of the present invention.

As shown in FIG. 4, the method of manufacturing an electrolyte for dye-sensitized solar cells according to an embodiment of the present invention includes a step (S110) of preparing an aqueous solution for molding hydrogels, a step (S130) of preparing the working electrode 10 and the counter electrode 20 disposed to face the working electrode 10 and injecting the aqueous solution for molding hydrogels between the working electrode 10 and the counter electrode 20, and a step (S140) of solidifying the aqueous solution for molding hydrogels to mold a hydrogel membrane between the working electrode 10 and the counter electrode 20, thereby producing a dye-sensitized solar cell including a hydrogel electrolyte.

That is, a dye-sensitized solar cell wherein a hydrogel membrane, as an electrolyte, is interposed between the working electrode 10 and the counter electrode 20 may be produced by injecting the aqueous solution for molding hydrogels between the working electrode 10 and the counter electrode 20 according to the present invention and solidifying the aqueous solution for molding hydrogels.

The step (S110) of preparing an aqueous solution for molding hydrogels is a step of solidifying an aqueous solution and molding the same into a hydrogel. The aqueous solution may be prepared using a known composition or a known manufacturing method, but the aqueous solution may be prepared by dissolving a water-soluble polymer and a crosslinking agent in water and a polymerization initiator may be added thereto such that an electrolyte for dye-sensitized solar cells according to a preferred embodiment of the present invention has excellent surface adhesion, excellent mechanical strength, high light transmittance and high flexibility. Such an aqueous solution may be cast into a mold to be molded. Here, an accelerator, in addition to the polymerization initiator, may be further added to the aqueous solution in which a water-soluble polymer and a cross-linking agent are dissolved.

The water-soluble polymer may be any one selected from the group consisting of alginic acid, chitosan, alginate, dextran, oxidized dextran, heparin, hyaluronic acid, agarose, carrageenan, amylopectin, amylose, glycogen, starch, cellulose, chitin, heparan sulfate, chondroitin sulfate, dextran sulfate, dermatan sulfate, keratan sulfate, pectins, xanthan gum, carboxymethylcellulose, homo- and copolymers of acrylamide, polyacrylic acid, polyethylene oxide, polyvinyl alcohol, a polyvinyl alcohol-polyvinyl acetate copolymer, poly(N-vinylpyrrolidone), and poly(hydroxyethyl) acrylate or a combination thereof. Such natural and synthetic water-soluble polymers may have preferably an average molecular weight of 100 to 1,000,000, more preferably, an average molecular weight of 700 to 200,000.

According to a particular embodiment, acrylamide and sodium alginate may be dissolved in water (or deionized water). Here, the amounts of water, acrylamide and sodium alginate are preferably 80 to 90 parts by weight, 10 to 15 parts by weight and 0.01 to 0.5 parts by weight, respectively, more preferably 85 to 90 parts by weight, 12 to 13 parts by weight and 0.4 to 0.5 parts by weight, respectively.

Here, the content of water is preferably 80 to 90 parts by weight, as described above. When the content of water is less than 80 parts by weight, the hygroscopicity of the hydrogel increases so that the hydrogel may deteriorate over time. When the content of water exceeds 80 parts by weight, the adhesive hydrogel may shrink when dried, or the properties thereof may be changed.

In a subsequent process, a polymerization initiator may be added to the aqueous solution, or a crosslinking agent may be further added thereto.

The polymerization initiator may be a photo-radical polymerization initiator or a thermal radical polymerization initiator. Here, the photo-radical polymerization initiator may be, without being specifically limited to, for example, α-hydroxy ketone, α-aminoketone, benzyl-methyl ketal, bisacylphosphine oxide, metallocene, or the like, more particularly 1-[4-(2-hydroxyethoxy)-phenyl]-2-hydroxy-2-methyl-propan-1-one, 2-hydroxy-2-methyl-1-phenyl-propan-1-one, 1-hydroxy-cyclohexyl-phenyl-ketone, 2-methyl-1-[(methylthio)phenyl]-2-morpholinopropan-1-one, 2-benzyl-2-dimethylamino-1-(4-morpholinophenyl)-butan-1-one, or the like. These photo-radical polymerization initiators may be used alone or as a combination of two or more thereof.

In addition, the thermal radical polymerization initiator may be, without being specifically limited to, for example, an organic peroxide such as benzoyl peroxide, an azo-based polymerization initiator such as azobisisobutyronitrile, a persulfate such as potassium persulfate or ammonium persulfate, an azo compound such as 2,2-azobisamidinopropane dihydrochloride, or the like.

According to an embodiment of the present invention, the content of the polymerization initiator is, without being specifically limited to, preferably 0.01 to 1 part by weight with respect to the aqueous solution, including acrylamide and sodium alginate. When the content of the polymerization initiator is less than 0.01 parts by weight, the polymerization reaction does not proceed sufficiently. When the content of the polymerization initiator exceeds 1 part by weight, the resulting hydrogel may be discolored (yellowed) or stink due to the residue of the polymerization initiator after the polymerization reaction.

More preferably, the content of the polymerization initiator may be 0.05 to 0.5 parts by weight.

In addition, in addition to the polymerization initiator, a crosslinking agent may be further added to the aqueous solution. According to a preferred embodiment, the crosslinking agent may be dissolved, without being specifically limited to, in the aqueous solution using N,N'-methylenebisacrylamide.

Although the type of the crosslinking agent is not specifically limited, the crosslinking agent is preferably two or more polymerizable double bonds in the molecule and may be, for example, N,N'-methylenebisacrylamide, diethylene glycol diacrylate and dimethacrylate, ethylene glycol diacrylate and dimethacrylate, tetra(ethylene glycol) diacrylate, 1,6-hexanediol diacrylate, divinylbenzene, trimethylolpropane triacrylate, poly(ethylene glycol) diacrylate, or the like. These compounds may be used alone or as a combination of two or more thereof.

The content of the crosslinking agent, according to an embodiment of the present invention, may be 0.001 to 0.05 parts by weight, more preferably 0.0015 to 0.02 parts by weight, with respect to the aqueous solution, including acrylamide and sodium alginate.

Meanwhile, the working electrode 10 and the counter electrode 20 may be prepared (S115).

The working electrode 10 may be formed by coating a conductive material on a substrate. Here, the substrate is not specifically limited as long as it preferably has transparency. Specifically, the substrate may be a transparent inorganic substrate such as quartz or glass, or a transparent polymer substrate such as polyethylene terephthalate, polyethylene naphthalate, polycarbonate, polystyrene, or polypropylene.

A conductive material coated on a substrate of the working electrode 10 may be, for example, indium tin oxide (ITO), fluorine-doped tin oxide (FTO), $ZnO-Ga_2O_3$, $ZnO-Al_2O_3$, $SnO_2-Sb_2O_3$, or the like, without being limited thereto.

In addition, the counter electrode 20 may be any conductive material. Even if the counter electrode 20 is an insulating material, it is sufficient if a conductive layer is formed on one side, which faces the working electrode 10, of the counter electrode 20.

That is, one surface of an insulating substrate may be modified as an electrode. Here, it is preferable to use an electrochemically stable material as an electrode. As particular examples, the electrochemically stable material may be one or more selected from the group consisting of platinum, gold, ruthenium, palladium, a conductive polymer, and a carbon-based material. Here, the conductive polymer may be one or more selected from the group consisting of PEDOT-PSS((poly(3,4-ethylenedioxythiophene))-(poly(styrenesulfonate) polyaniline CSA, pentacene, polyacetylene, P3HT(poly(3-hexylthiophene), polysiloxane carbazole, polyaniline, polyethylene oxide, poly(1-methoxy-4-(0-disperse Red 1)-2,5-phenylene-vinylene, polyindole, polycarbazole, polypyridazine, polyisocyanaphthalene, polyphenylene sulfide, polyvinylpyridine, polythiophene, polyfluorene, polypyridine, polypyrrole, polysulfur nitride and a copolymer thereof, and the carbon-based material may be activated carbon, graphite, carbon nanotube, carbon black, graphene or a mixture thereof.

Figure 7:
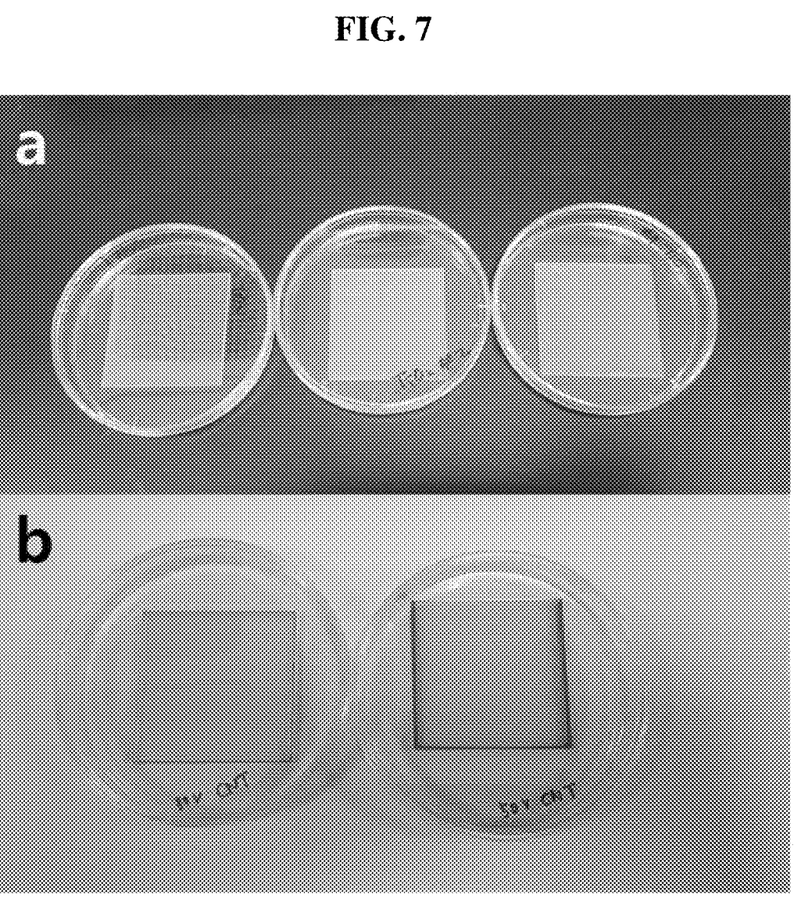
FIG. 7 is a set of photographs illustrating a counter electrode formed by coating a conductive material on a substrate according to an embodiment of the present invention.

As an embodiment, an image of ITO glass modified into the counter electrode 20 using carbon nanotubes is illustrated in FIG. 7(*b*).

Next, the aqueous solution for molding hydrogels may be injected between the working electrode 10 and the counter electrode 20 provided to face the working electrode 10 (S130).

That is, according to an embodiment of the present invention, the aqueous solution for molding hydrogels is injected between the working electrode 10 and the counter electrode 20 spaced apart by a predetermined distance from the working electrode 10 (S130), and the aqueous solution for molding hydrogels is solidified so that a hydrogel membrane, molded as an electrolyte, is interposed between the working electrode 10 and the counter electrode 20 (S140).

The working electrode 10 and the counter electrode 20 between which the aqueous solution for molding hydrogels is injected are molds, and may form at least two surfaces facing each other.

An accelerator, which is a catalyst added to increase the reaction rate of the injected aqueous solution for molding hydrogels, may be added to the aqueous solution for molding hydrogels.

Here, the accelerator may also be dissolved, without being specifically limited to, in the aqueous solution using N,N,N',N'-tetramethylenediamine according to a preferred embodiment.

The content of the accelerator according to an embodiment of the present invention, may be, without being specifically limited to, 0.01 to 0.05 parts by weight, preferably 0.03 to 0.04 parts by weight, with respect to the aqueous solution, including acrylamide and sodium alginate.

After the dissolution of the accelerator, gelation may be quickly performed. In this case, a gap between the working electrode 10 and the counter electrode 20 may be controlled to adjust the thickness of the electrolyte for dye-sensitized solar cells. As the gap between the working electrode 10 and the counter electrode 20 is narrower under the condition that the working electrode 10 and the counter electrode 20 are not in direct contact with each other, the ionic resistance is decreased so that the power generation efficiency increases.

In consideration of manufacturing safety and efficiency, the distance between surfaces of the electrode materials coated on the working electrode 10 and the counter electrode 20 is preferably 10 μm to 20 μm. The distance may increase as the areas of the electrodes increase, but the maximum distance is preferably 100 μm or less.

Here, heating may be performed to promote a gelation reaction due to the accelerator, and UV light may be irradiated to promote the reaction of N,N,N',N'-tetramethylenediamine during the heat treatment process.

The heat treatment process may be performed in a dryer at 30 to 60° C. for 0.5 to 5 hours, preferably at 50° C. for 1 to 3 hours. To promote the reaction of N,N,N',N'-tetramethylenediamine during the heat treatment process, UV light may be used.

Here, a plurality of grooves may be formed in at least a portion of the surfaces of the working electrode 10 and/or counter electrode 20 facing the hydrogel film to be molded so as to prevent detachment by expanding a contact area.

Meanwhile, before the step (S130) of injecting the aqueous solution for molding hydrogels between the working electrode 10 and the counter electrode 20 according to an embodiment of the present invention, a step (S120) of forming a light absorption layer, which includes a metal oxide coated with a dye, on one side surface of the working electrode 10 may be further included.

The light absorption layer 13 may be formed on one side surface of the working electrode 10 and may include the metal oxide 11 coated with the dye 12.

Figure 5:
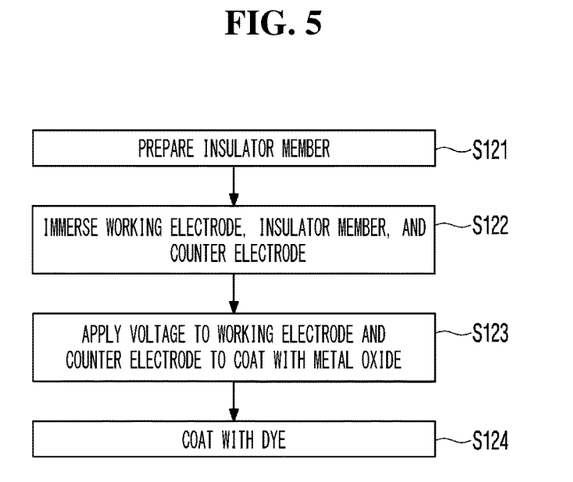
FIG. 5 illustrates a step-by-step flowchart of a method of forming a light absorption layer according to an embodiment of the present invention.
Figure 6:
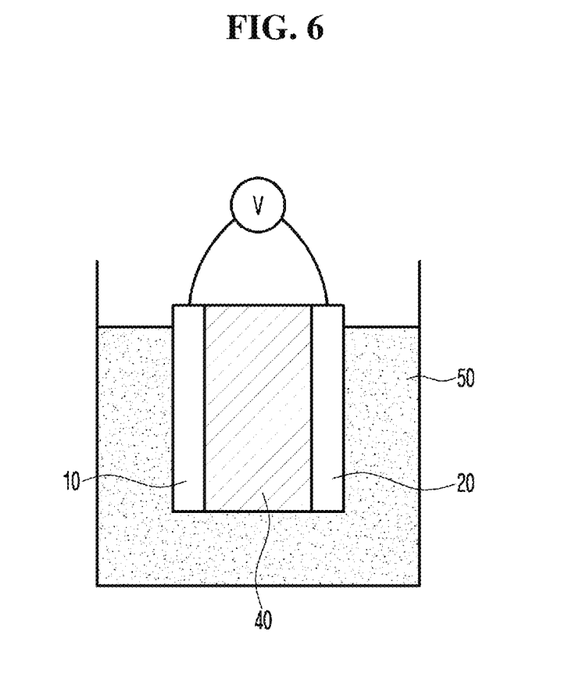
FIG. 6 illustrates a process of coating a metal oxide on an electrode of a dye-sensitized solar cell according to an embodiment of the present.

To form the light absorption layer 13, including a dye-coated metal oxide on one side surface of the working electrode 10, the working electrode 10, the counter electrode 20, and a non-conductive member 40 to be interposed between the working electrode 10 and the counter electrode 20 are prepared (S121), the working electrode 10 and the counter electrode 20 between which the non-conductive member 40 is interposed are immersed in a solution 50 in which a metal oxide is dissolved (S122), and voltage (V) is applied to the working electrode 10 and the counter electrode 20 according to an embodiment of the present invention as shown in FIGS. 5 and 6, so that at least one exposed surface of the working electrode 10 and the counter electrode 20 may be coated with the metal oxide.

Here, the metal oxide may be, without being limited to, one or more selected from the group consisting of tin (Sn) oxide, antimony (Sb), niobium (Nb) or fluorine-doped tin (Sn) oxide, indium (In) oxide, tin-doped indium (In) oxide, zinc (Zn) oxide, aluminum (Al), boron (B), gallium (Ga), hydrogen (H), indium (In), yttrium (Y), titanium (Ti), silicon (Si)- or tin (Sn)-doped zinc (Zn) oxide, magnesium (Mg) oxide, cadmium (Cd) oxide, magnesium zinc (MgZn) oxide, indium zinc (InZn) oxide, copper aluminum (CuAl) oxide, silver (Ag) oxide, gallium (Ga) oxide, zinc tin oxide (ZnSnO), titanium oxide ($TiO_2$) and zinc indium tin (ZIS) oxide, nickel (Ni) oxide, rhodium (Rh) oxide, ruthenium (Ru) oxide, iridium (Ir) oxide, copper (Cu) oxide, cobalt (Co) oxide, tungsten (W) oxide, titanium (Ti) oxide, zirconium (Zr) oxide, strontium (Sr) oxide, lanthanum (La) oxide, vanadium (V) oxide, molybdenum (Mo) oxide, niobium (Nb) oxide, aluminum (Al) oxide, yttrium (Y) oxide, scandium (Sc) oxide, samarium (Sm) oxide and strontium titanium (SrTi) oxide. According to a preferred embodiment of the present invention, the metal oxide may be titanium oxide ($TiO_2$) in the form of particles.

More preferably, the metal oxide is preferably nanoparticles having an average particle diameter of 10 to 100 nm so as for electrons to easily pass therethrough.

As an embodiment, an image of an ITO glass surface-modified into a metal oxide layer using $TiO_2$ is illustrated in FIG. 7(a).

A solvent for dissolving the metal oxide may be selected from among water, an organic solvent, a mixture of water and an organic solvent, and a polymer medium. The organic solvent may be selected from among methanol, ethanol, butanol, cyclohexane, tetrahydrofuran (THF), dimethylformamide (DMF), N-methyl-2-pyrrolidone (NMP), acetylacetone, dimethylacetamide (DMAc) and a combination thereof, without being limited thereto. The polymer medium may include a water-soluble polymer such as polyethylene oxide (PEO), or an aqueous solution thereof, without being limited thereto.

The pH of the solution 50 in which the metal oxide is dissolved may be adjusted to 3 to 5, preferably 4, to improve the adsorption degree, uniformity, etc. of the coating. For this, hydrogen chloride (HCl) or sodium hydroxide (NaOH) may be appropriately added. Depending on particle types, an organic solvent or an aqueous solution may be used alone or as a mixture, and may be used without adjusting the pH thereof.

The voltage applied to the working electrode 10 and the counter electrode 20 and an application time of the voltage are not specifically limited, but preferably a DC voltage of 1 to 5 V, more preferably a DC voltage of 2 to 4V, may be applied for 3 to 20 minutes, preferably 5 to 10 minutes.

The non-conductive member 40, which is a bulky insulating mass, is interposed in close contact between the working electrode 10 and the counter electrode 20. This is immersed in a solution in which a metal oxide is dissolved so that the metal oxide is not adsorbed on the surfaces of the working electrode 10 and counter electrode 20 facing the member 40.

Next, the light absorption layer 13 may be formed by applying a dye solution on the metal oxide 11 coated on one side surface of the working electrode 10. Alternatively, the light absorption layer 13 may be formed by immersing the metal oxide, coated on one side surface of the working electrode 10, in a dye solution for 20 to 30 hours, preferably 24 hours.

The dye is not specifically limited as long as it is generally used in a dye-sensitized solar cell but is preferably a ruthenium complex. The dye is not specifically limited as long as it has a charge separation function and exhibits a sensitization action, and in addition to a ruthenium complex, xanthine-based pigments such as rhodamine B, rose bengal, eosin, and erythrosine; cyanine-based pigments such as quinocyanine and cryptocyanine; basic dyes such as phenosafranin, capri blue, thiosine and methylene blue; porphyrin-based compounds such as chlorophyll, zinc porphyrin, and magnesium porphyrin; other azo pigments; phthalocyanine compounds; complex compounds such as Ru trisbipyridyl; anthraquinone pigments; polycyclic quinone pigments; and the like may be used. These compounds may be used alone or as a mixture of two or more thereof. As the ruthenium complex, $RuL_2(SCN)_2$, $RuL_2(H_2O)_2$, $RuL_3$, $RuL_2$, where L denotes 2,2'-bipyridyl-4,4'-dicarboxylate, etc., or the like may be used.

The dye solution may be prepared by dissolving the dye in water (or deionized water) and cooling the same after heat treatment. For example, as a ruthenium-based dye, N719 may be dissolved at a concentration of 0.3 mM and used. A solvent for dissolving the dye may be acetonitrile or ethanol, or a mixture of acetonitrile or ethanol in a 1:1 ratio. Here, the concentration of the dye is preferably $1×10^{-4}$ M to 0.02 M.

In a state where the working electrode 10 on which the light absorption layer 13 has been formed as described above; and the counter electrode 20 are spaced apart from each other to face each other, the aqueous solution for molding hydrogels is injected (S130) and solidified, thereby manufacturing the dye-sensitized solar cell 1 wherein the electrolyte of the hydrogel membrane is provided between the working electrode 10 and the counter electrode 20. Here, when the working electrode 10 and the counter electrode 20 are disposed to face each other, the light absorption layer 13 should be disposed to face the counter electrode 20.

To improve the conductivity of the hydrogel membrane as an electrolyte, the working electrode 10 and the counter electrode 20 between which the hydrogel membrane is interposed may be immersed in an electrolyzing solution containing iodine and iodide (S150), and the iodine ion-impregnated hydrogel membrane may be dried (S160).

The electrolyzing solution is prepared by dissolving iodine and iodide in water (or deionized water). The concentration of iodine and iodide in the electrolyzing solution may be preferably 0.03 to 2 M, more preferably 0.05 to 1 M.

When the concentration of iodine or iodide is less than 0.03 M, the conductivity of the electrolyte is low. When the concentration of iodine or iodide exceeds 2 M, it is difficult to dissolve solid iodine in deionized water.

When dissolved in a non-polar solvent, the solubility is very high compared to when dissolved in water, and when dissolved in other organic solvents such as methanol and ethanol, solubility is higher than when dissolved in water. However, it is preferable to use water as the main solvent to secure the safety and reliability of the dye-sensitized solar cell. That is, water may be used as a solvent to inject ions into the formed hydrogel membrane.

The iodide preferably contains a compound having an iodide ion as a counterion capable of releasing an iodide ion. The compound having an iodide ion as a counterion is not specifically limited so long as it is a compound capable of providing an iodide ion to a solution, and the compound is preferably a compound with a high degree of dissociation of an iodide ion.

As a specific example, the compound having an iodide ion as a counterion may be lithium iodide, sodium iodide, potassium iodide, trimethylammonium iodide, tetrabutylammonium iodide, 1,3-dimethylimidazolium iodide, 1-ethyl-3-methylimidazolium iodide, 1-methyl-3-propylimidazolium iodide, 1-butyl-3-methylimidazolium iodide and 1,2-dimethyl-3-propylimidazolium iodide, or the like. These compounds may be used alone or as a combination of two or more thereof.

To promote dissolution of iodine and iodide in water, the solution may be heated using a heating device such as a hot plate at 30 to 50° C. or may be mixed using a magnetic bar.

Next, the hydrogel membrane is preferably immersed in the electrolyzing solution such that iodide ions sufficiently permeate into the hydrogel membrane and are preferably allowed to stand for a certain time at room temperature.

Here, the standing time preferably depends upon the area of the hydrogel membrane. According to an embodiment, the standing time is preferably 1 minute or more because iodide ions do not sufficiently permeate the hydrogel membrane when the standing time is less than 1 minute.

Here, the standing time may be 2 hours or more or until the iodide is all wetted by the hydrogel. In this case, the electrolyzing solution serves as a kind of stock solution such that the moisture of a produced hydrogel membrane does not evaporate and dry.

The concentration of iodide ions in the hydrogel membrane may be arbitrarily adjusted by taking out the iodide ion-permeated hydrogel membrane at a certain time after 1 minute after immersing the hydrogel membrane in the electrolyzing solution at room temperature.

In addition, the concentration of iodide ions in the hydrogel membrane may be controlled by injecting iodide ions into a mold for producing hydrogel membranes.

The electrolyte of the dye-sensitized solar cell, according to an embodiment of the present invention, can be prepared by taking out the hydrogel membrane permeated with iodide ions from the electrolyzing solution and drying it at room temperature.

Meanwhile, a hydrogel membrane may be molded by injecting the aqueous solution for molding hydrogels between the working electrode 10 and the counter electrode 20 and solidifying the aqueous solution as described above, or, according to another embodiment of the present invention, the aqueous solution for molding hydrogels may be injected between the working electrode 10 and a dummy substrate and then solidified to mold a hydrogel membrane between the working electrode 10 and the dummy substrate, and then the dummy substrate may be removed, and then the counter electrode 20 may be attached to an exposed surface of the hydrogel membrane.

In the same manner, it is natural that the aqueous solution for molding hydrogels may be injected between the counter electrode 20 and the dummy substrate and solidified to mold a hydrogel membrane between the counter electrode 20 and the dummy substrate, and then the dummy substrate may be removed, and then the working electrode 10 may be attached to an exposed surface of the hydrogel membrane.

Here, the dummy substrate is used as a mold for solidifying an aqueous solution for molding hydrogels, and any dummy substrate having a predetermined rigidity may be used. For example, a substrate made of silicon or Teflon material may be used.

By injecting the aqueous solution for molding hydrogels in a state where the working electrode 10 on which the light absorption layer has been formed, and the dummy substrate are spaced from each other to face each other, and then solidifying the same, a hydrogel film as an electrolyte may be provided between the working electrode 10 and the dummy substrate.

To replace the dummy substrate with the counter electrode 20, the dummy substrate may be removed from the hydrogel membrane to expose one surface of the hydrogel. Here, before attaching the counter electrode 20 to the hydrogel membrane, the working electrode 10 to which the hydrogel membrane is exposed and whose one surface is exposed may be immersed in the electrolyte solution containing iodine or iodide (S150) to inject iodine ions into the hydrogel membrane, and then the iodine ion-impregnated hydrogel membrane may be dried (S160).

Next, it is natural that, after drying, a previously prepared counter electrode 20 may be attached to the exposed surface of the hydrogel membrane, thereby manufacturing a dye-sensitized solar cell wherein the iodine ion-impregnated hydrogel membrane is provided between the working electrode 10 and the counter electrode 20.

Hereinafter, specific examples of the dye-sensitized solar cell of the present invention are described in detail. These examples should not be construed as limiting the scope of the present invention.

Example 1—Dye-Sensitized Solar Cell

After dissolving 5 g of titanium dioxide in 1000 ml of acetylacetone, 250 ml of the mixture was contained in another container and the pH thereof was adjusted to 4. Next, an insulator was interposed between two glass substrates, coated with FTO, as a working electrode and a counter electrode and immersed, and then a DC power of 3V was applied to the two electrodes for 5 to 10 minutes so that titanium dioxide was coated on the working electrode and the counter electrode.

The titanium dioxide-coated working electrode was heat-treated at 450° C. for 30 minutes and then cooled to 80° C. Next, N719 dye was dissolved to a concentration of 0.3 mM in a solvent prepared by mixing acetonitrile and ethanol in a ratio of 1:1, and applied over the coated titanium dioxide and dried.

Meanwhile, Deionized water, acrylamide and sodium alginate were prepared in a ratio of 87.4 parts by weight, 12.19 parts by weight, and 0.41 parts by weight, respectively. Acrylamide and sodium alginate were dissolved in deionized water, and then 0.12 parts by weight of ammonium persulfate with respect to the solution and 0.018 parts by weight of N,N'-methylenebisacrylamide with respect to the solution were additionally dissolved in the solution. This solution was maintained in a vacuum chamber until air bubbles therein were removed. As a result, an aqueous solution for molding hydrogels was prepared.

After the dye-applied working electrode and the counter electrode were spaced apart from each other to face each other to make a square mold, the evacuated aqueous solution for molding hydrogels was injected between the working electrode and the counter electrode. Next, N,N,N',N'-tetramethylenediamine was additionally dissolved in an amount of 0.034 parts by weight with respect to the mixture of deionized water, acrylamide and sodium alginate in the aqueous solution for molding hydrogels, and then thermally treated in a 50° C. dryer for 2 hours. UV light was irradiated during the heat treatment process to solidify and mold the hydrogel membrane.

Meanwhile, iodine and lithium iodide were dissolved in deionized water at a concentration of 0.05 M, respectively. To promote dissolution, the mixture was stirred by means of a magnetic bar while heating to 40° C. using a hot plate.

The working electrode and the counter electrode between which the hydrogel membrane was molded were immersed for 30 minutes in the electrolyzing solution in which iodine and lithium iodide were dissolved and then taken out and dried at room temperature until the water was removed.

Next, the hydrogel solidified on the outer surface of the working electrode, and the hydrogel and titanium dioxide solidified on the outer surface of the counter electrode were removed.

Finally, an external wire was connected to the working electrode and the counter electrode, and the sides of the working electrode and the counter electrode were sealed to prevent evaporation of the electrolyte.

The desirable embodiments of the present invention have been described in detail with reference to the accompanying drawings. The aforementioned description of the present invention is provided by way of example and those skilled in the art will understand that the present invention can be easily changed or modified into other specified forms without change or modification of the technical spirit or essential characteristics of the present invention.

Therefore, it should be understood that the scope of the present invention is defined by the following claims rather than the aforementioned detailed description and the invention is to cover all modifications, equivalents, and alternatives falling within the spirit and scope of the invention as defined by the claims.

The invention claimed is:

1. A method of manufacturing a dye-sensitized solar cell, the method comprising:
    adding a polymerization initiator to an aqueous solution prepared by dissolving a water-soluble polymer and a crosslinking agent in water to prepare an aqueous solution for molding hydrogels;
    injecting the aqueous solution for molding hydrogels between a working electrode and a counter electrode provided to face the working electrode; and
    solidifying the aqueous solution for molding hydrogels to mold a hydrogel membrane between the working electrode and the counter electrode.

2. The method according to claim 1, wherein the counter electrode is formed by coating a conductive material on a substrate, the conductive material being any one selected from the group consisting of platinum, gold, carbon and carbon nanotubes (CNT), or a combination thereof.

3. The method according to claim 1, wherein, before the injecting of the aqueous solution, forming a light absorption layer, which comprises a metal oxide coated with a dye, on one side surface of the working electrode is further comprised.

4. The method according to claim 3, wherein the forming of the light absorption layer comprises:
    preparing a non-conductive member;
    immersing the working electrode and the counter electrode, between which the non-conductive member is interposed, in a solution in which a metal oxide is dissolved;

applying a voltage to the working electrode and the counter electrode to coat at least one exposed surface of the working electrode and the counter electrode with the metal oxide; and applying a dye solution to the metal oxide coated on one side surface of the working electrode to form the light absorption layer.

5. The method according to claim 4, wherein in the immersing of the working electrode and the counter electrode, the solution is prepared by dissolving $TiO_2$ as the metal oxide in acetylacetone as an organic solvent, and the working electrode and the counter electrode between which the non-conductive member is interposed is immersed in the solution.

6. The method according to claim 1, wherein, before the injecting of the aqueous solution, forming a light absorption layer comprising a metal oxide on one side surface of the working electrode; and coating the light absorption layer with a dye; are further comprised.

7. The method according to claim 1, further comprising immersing the hydrogel membrane in an electrolyzing solution containing iodine and iodide to impregnate the hydrogel membrane with iodide ions.

8. A method of manufacturing a dye-sensitized solar cell, the method comprising:
    adding a polymerization initiator to an aqueous solution prepared by dissolving a water-soluble polymer and a crosslinking agent in water to prepare an aqueous solution for molding hydrogels;
    injecting the aqueous solution for molding hydrogels between a working electrode or a counter electrode and a dummy substrate;
    solidifying the aqueous solution for molding hydrogels to mold a hydrogel membrane between the working electrode or the counter electrode and the dummy substrate; and
    removing the dummy substrate and attaching the counter electrode or the working electrode to an exposed surface of the hydrogel membrane.

9. The method according to claim 8, wherein, before the removing of the dummy substrate, immersing the hydrogel membrane in an electrolyzing solution containing iodine and iodide to impregnate the hydrogel membrane with iodide ions is further comprised.

10. The method according to claim 8, wherein the counter electrode is formed by coating a conductive material on a substrate, the conductive material being any one selected from the group consisting of platinum, gold, carbon and carbon nanotubes (CNT), or a combination thereof.

11. The method according to claim 8, wherein, before the injecting of the aqueous solution, forming a light absorption layer, which comprises a metal oxide coated with a dye, on one side surface of the working electrode is further comprised.

12. The method according to claim 8, wherein, before the injecting of the aqueous solution, forming a light absorption layer comprising a metal oxide on one side surface of the working electrode and coating the light absorption layer with a dye are further comprised.

13. A method of manufacturing an electrolyte for dye-sensitized solar cells, the method comprising:
    preparing a hydrogel membrane;
    immersing the hydrogel membrane in an electrolyzing solution containing iodine or iodide such that the hydrogel membrane is impregnated with iodide ions; and
    drying the hydrogel membrane,
    wherein, in the preparing of the hydrogel membrane, a polymerization initiator and an accelerator are added to an aqueous solution in which a water-soluble polymer and a crosslinking agent are dissolved, and cast into a mold.

14. A method of manufacturing an electrolyte for dye-sensitized solar cells, the method comprising:
    preparing a hydrogel membrane;
    immersing the hydrogel membrane in an electrolyzing solution containing iodine or iodide such that the hydrogel membrane is impregnated with iodide ions; and
    drying the hydrogel membrane,
    wherein in the preparing of the hydrogel membrane, a polymerization initiator and an accelerator are added to an aqueous solution in which a water-soluble polymer and a crosslinking agent are dissolved, and the aqueous solution is injected between two plates.

15. A method of manufacturing an electrolyte for dye-sensitized solar cells, the method comprising:
    preparing a hydrogel membrane;
    immersing the hydrogel membrane in an electrolyzing solution containing iodine or iodide such that the hydrogel membrane is impregnated with iodide ions; and
    drying the hydrogel membrane,
    wherein the electrolyzing solution is prepared by immersing the hydrogel membrane in a solution in which iodine or the iodide is dissolved at a concentration of 0.03 to 2 M, and
    wherein in the preparing of the hydrogel membrane, a polymerization initiator and an accelerator are added to an aqueous solution in which a water-soluble polymer and a crosslinking agent are dissolved, and the aqueous solution is injected between two plates, and
    in the immersing of the hydrogel membrane, one of the two plates is separated, and then immersed in the electrolyzing solution, and then allowed to stand for a predetermined time.

16. A method of manufacturing an electrolyte for dye-sensitized solar cells, the method comprising:
    preparing a hydrogel membrane;
    immersing the hydrogel membrane in an electrolyzing solution containing iodine or iodide such that the hydrogel membrane is impregnated with iodide ions; and
    drying the hydrogel membrane,
    wherein, in the adding of the polymerization initiator to the aqueous solution, an accelerator is further added.

* * * * *